United States Patent
Ogawa et al.

(10) Patent No.: US 11,486,511 B2
(45) Date of Patent: Nov. 1, 2022

(54) ELECTROMAGNETIC VALVE DRIVE DEVICE

(71) Applicants: Hitachi Astemo, Ltd., Hitachinaka (JP); Nuvoton Technology Corporation Japan, Nagaokakyo (JP)

(72) Inventors: Atsushi Ogawa, Hitachinaka (JP); Motoaki Kato, Hitachinaka (JP); Kengo Nomura, Hitachinaka (JP); Keisuke Kuroda, Osaka (JP); Makoto Kawajiri, Kyoto (JP)

(73) Assignees: HITACHI ASTEMO, LTD., Hitachinaka (JP); NUVOTON TECHNOLOGY CORPORATION JAPAN, Nagaokakyo (JP)

( * ) Notice: Subject to any disclaimer, the term of this patent is extended or adjusted under 35 U.S.C. 154(b) by 0 days.

(21) Appl. No.: 17/391,568

(22) Filed: Aug. 2, 2021

(65) Prior Publication Data
US 2022/0099209 A1 Mar. 31, 2022

(30) Foreign Application Priority Data
Sep. 30, 2020 (JP) .............................. JP2020-164689

(51) Int. Cl.
*F02M 47/02* (2006.01)
*F02D 41/20* (2006.01)
*F16K 31/06* (2006.01)

(52) U.S. Cl.
CPC .......... *F16K 31/0655* (2013.01); *F02D 41/20* (2013.01); *F02M 47/027* (2013.01); *F16K 31/0675* (2013.01); *F02D 2041/2058* (2013.01)

(58) Field of Classification Search
CPC ...... F02M 47/02; F02M 47/027; F02D 41/20; F02D 2041/2058; F16K 31/06; F16K 31/0655; F16K 31/0675
See application file for complete search history.

(56) References Cited

U.S. PATENT DOCUMENTS

| | | | | |
|---|---|---|---|---|
| 4,612,597 A | * | 9/1986 | Hamren | F02D 41/20 361/152 |
| 5,452,700 A | * | 9/1995 | Matsuura | H03K 17/64 361/152 |

(Continued)

FOREIGN PATENT DOCUMENTS

JP 2016223348 A 12/2016

*Primary Examiner* — John Kwon
*Assistant Examiner* — Johnny H Hoang
(74) *Attorney, Agent, or Firm* — Cantor Colburn LLP

(57) ABSTRACT

An electromagnetic valve drive device which supplies a hold current with a prescribed fluctuation range to an electromagnetic coil of an electromagnetic valve after a current peak when a supply of electricity starts has passed includes: a power supplier which intermittently applies a drive voltage to the electromagnetic coil; a detector which detects the hold current; a first comparator which compares a detected current by the detector with a first threshold value; a filter which performs integration processing on an output of the first comparator; a second comparator which compares an output of the filter with a second threshold value to generate an output signal used for generating a control signal for controlling the power supplier; and a control signal generator which generates the control signal for controlling the power supplier based on the output signal of the second comparator, wherein the filter is a count-up/down type digital filter.

6 Claims, 4 Drawing Sheets

(56) References Cited

U.S. PATENT DOCUMENTS

| | | | |
|---|---|---|---|
| 2011/0180040 A1* | 7/2011 | Czimmek | F02M 57/005 |
| | | | 123/549 |
| 2015/0128912 A1* | 5/2015 | Nishida | F02D 41/30 |
| | | | 123/480 |
| 2016/0177855 A1* | 6/2016 | Kusakabe | F02M 51/0685 |
| | | | 123/490 |
| 2021/0218360 A1* | 7/2021 | Ohara | B60W 50/0205 |

* cited by examiner (a)

(b)

ELECTROMAGNETIC VALVE DRIVE DEVICE

CROSS REFERENCE TO RELATED APPLICATIONS

The present invention claims priority under 35 U.S.C. § 119 to Japanese Application No. 2020-164689, filed Sep. 30, 2020, the entire content of which is incorporated herein by reference.

TECHNICAL FIELD

The present invention relates to an electromagnetic valve drive device.

BACKGROUND ART

Patent Document 1 which will be described later discloses a control device of an internal combustion engine. The control device turns on/off, in a hold current control period after a current being conducted through a coil to open a fuel injection valve has reached a peak current command value, a holding control switching element to apply a terminal voltage of a battery to the coil and to intermittently supply a hold current to the coil. According to such a control device, although there is some ripple, it is possible to supply a substantially constant hold current to a coil. Thus, it is possible to maintain an open state of the fuel injection valve for a prescribed time.

RELATED ART DOCUMENTS

Patent Document

[Patent Document 1] Japanese Unexamined Patent Application, First

SUMMARY

Technical Problem

Incidentally, in the control device, setting the ripple within a desired current range may be difficult due to the incorporation of noise in some cases. For example, although a boosted voltage obtained by boosting a terminal voltage of a battery by a boost circuit (a chopper circuit) may be used to drive a coil in the control device, the switching noise of the chopper control switching element of the boost circuit acts as a disturbance in the control of the holding control switching element. Thus, it may not be possible to limit a fluctuation range (ripple) of the hold current to within a desired range in some cases.

The present invention was made in view of the above circumstances, and an object of the present invention is to limit a fluctuation range of a hold current of an electromagnetic valve to within a desired range more accurately than in the related art.

Solution to Problem

In order to achieve the above object, in the present invention, as a first solution means associated with an electromagnetic valve drive device, a means in which an electromagnetic valve drive device which supplies a hold current with a prescribed fluctuation range to an electromagnetic coil of an electromagnetic valve after a current peak when a supply of electricity starts has passed, including: a power supplier which intermittently applies a drive voltage to the electromagnetic coil; a detector which detects the hold current; a first comparator which compares a detected current by the detector with a first threshold value; a filter which performs integration processing on an output of the first comparator; a second comparator which compares an output of the filter with a second threshold value to generate an output signal used for generating a control signal for controlling the power supplier; and a control signal generator which generates the control signal for controlling the power supplier based on the output signal of the second comparator, wherein the filter is a count-up/down type digital filter is adopted.

In the present invention, as a second solution means associated with the electromagnetic valve drive device, in the first solution means, means in which the first threshold value is a maximum value threshold value and/or minimum value threshold value to set a maximum value and/or a minimum value of the hold current, and the control signal generator controls the maximum value and/or the minimum value of the hold current by stopping or by stopping and resuming an application of the drive voltage to the electromagnetic coil is adopted.

In the present invention, as a third solution means associated with the electromagnetic valve drive device, in the second solution means, means in which the electromagnetic valve drive device further includes: a boost circuit which boosts a battery voltage to generate a boosted voltage; and a second power supplier which applies the boosted voltage to the electromagnetic coil so as to supply electricity with the current peak to the electromagnetic coil is adopted.

In the present invention, as a fourth solution means associated with the electromagnetic valve drive device, in any one of the first to third solution means, a means in which the electromagnetic valve is a fuel injection valve which injects fuel directly into a cylinder of a direct injection engine is adopted.

Effects of the Invention

According to the present invention, it is possible to limit a fluctuation range of a hold current of an electromagnetic valve within a desired range more accurately than that in the related art.

DETAILED DESCRIPTION

An embodiment of the present invention will be described below with reference to the drawings.

A fuel injection valve drive device K according to the embodiment is an electromagnetic valve drive device which drives a fuel injection valve B (an electromagnetic valve)

and drives the fuel injection valve B based on a battery voltage (a battery power source) supplied from an external battery and an external control command input from an external higher-ordered control system as well.

Figure 1:
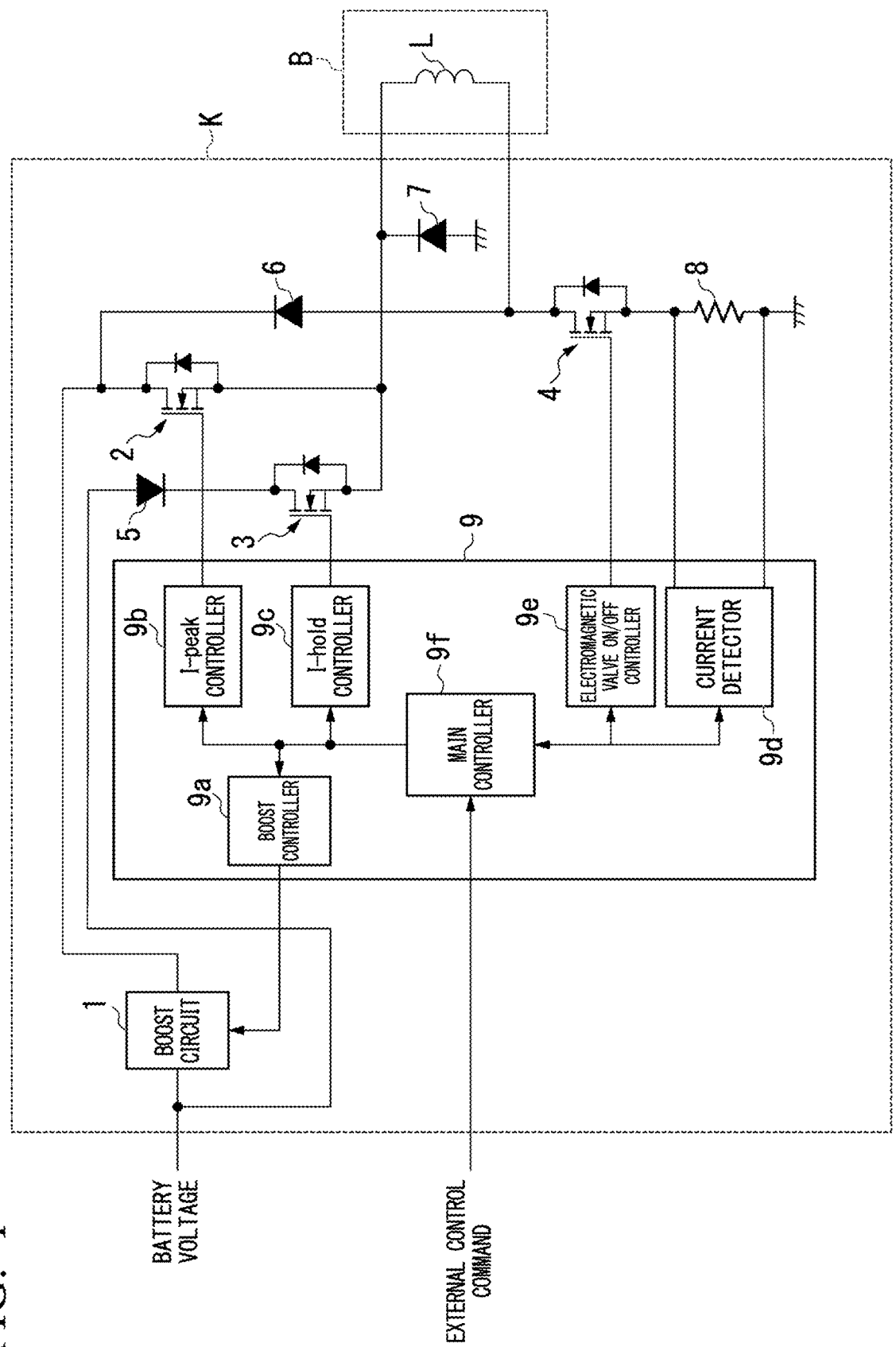
FIG. 1 is a circuit diagram illustrating a constitution of a fuel injection valve drive device according to an embodiment of the present invention.

As illustrated in FIG. 1, the fuel injection valve B is an electromagnetic valve (a solenoid valve) which includes an electromagnetic coil L and through which fuel is directly injected into a cylinder of a direct injection gasoline engine installed in a vehicle. That is to say, the fuel injection valve drive device K has, as a driving target, the fuel injection valve B (the electromagnetic valve) which opens and closes a fuel flow path by moving a valve body by a magnetic force generated due to the electromagnetic coil L.

As illustrated in FIG. 1, such a fuel injection valve drive device K includes a boost circuit 1, a first semiconductor switch 2, a second semiconductor switch 3, a third semiconductor switch 4, a first diode 5, a second diode 6, a third diode 7, a current detection resistor 8, a control IC 9, and the like.

Also, among such constituent elements, as illustrated in FIG. 1, the control IC 9 includes a boost controller 9a, an I-peak controller 9b, an I-hold controller 9c, a current detector 9d, an electromagnetic valve on/off controller 9e, and a main controller 9f.

The control IC 9 may be constituted of a computer (for example, an electronic controller). In this case, the computer may include a processor such as a central processing unit (CPU), a random access memory (RAM), and the like.

The boost circuit 1 is a chopper circuit which boosts a battery voltage input from the battery to a prescribed boosted voltage. That is to say, the boost circuit 1 includes a boost switch which switches a battery voltage based on a boost control signal input from the boost controller 9a and outputs the boosted voltage obtained by an operation of the boost switch to the first semiconductor switch 2.

A ratio of the boosted voltage to the battery voltage, that is, a boost ratio is set by a duty ratio of a boost pulse and is, for example, about 2 to 10. The boost ratio of the boost circuit 1 is controlled by boost pulse input from the boost controller 9a in the control IC 9. Such a boost circuit 1 has a regenerative function capable of regenerating a regenerative current which will be described later to the battery.

The first semiconductor switch 2 is a MOS transistor as shown in the drawings and is provided between an output end of the boost circuit 1 and one end of the electromagnetic coil L. That is to say, the first semiconductor switch 2 includes a drain terminal connected to the output end of the boost circuit 1, a source terminal connected to one end of the electromagnetic coil L, and a gate terminal connected to an output end of the I-peak controller 9b. A turning on/off (closing/opening) operation of such a first semiconductor switch 2 is controlled by the I-peak controller 9b.

The first semiconductor switch 2 corresponds to a second power supplier in the present invention. That is to say, the first semiconductor switch 2 corresponds to the second power supplier which applies the boosted voltage to the electromagnetic coil L so as to supply electricity with a current peak when a current starts to be supplied to the electromagnetic coil L to the electromagnetic coil L.

The second semiconductor switch 3 is a MOS transistor like the first semiconductor switch 2 and is provided between a cathode terminal of the first diode 5 and one end of the electromagnetic coil L. That is to say, the second semiconductor switch 3 includes a drain terminal connected to the cathode terminal of the first diode 5, a source terminal connected to one end of the electromagnetic coil L, and a gate terminal connected to an output end of the I-hold controller 9c.

A turning on/off (closing/opening) operation of the second semiconductor switch 3 is controlled by the I-hold controller 9c and the second semiconductor switch 3 intermittently applies, to the electromagnetic coil L, a hold voltage (a drive voltage) which will be described later. That is to say, the second semiconductor switch 3 corresponds to the power supplier in the present invention.

Such a first semiconductor switch 2 and a second semiconductor switch 3 function as selection switches in which one of a battery voltage and a boosted voltage (a power source voltage) obtained by the boost circuit 1 is selected and applied to the electromagnetic coil L of the fuel injection valve B (the electromagnetic valve).

The third semiconductor switch 4 is a MOS transistor like the first and second semiconductor switches 2 and 3 and includes a drain terminal connected to the other end of the electromagnetic coil L, a source terminal connected to one end of the current detection resistor 8, and a gate terminal connected to an output end of the electromagnetic valve on/off controller 9e. A turning on/off (closing/opening) operation of such a third semiconductor switch 4 is controlled by the electromagnetic valve on/off controller 9e.

The first diode 5 includes an anode terminal connected to an output end of the battery and a cathode terminal connected to the drain terminal of the second semiconductor switch 3. The first diode 5 is a backflow prevention diode which prevents a current from flowing from the boost circuit 1 into the battery via the second semiconductor switch 3 when both of the first semiconductor switch 2 and the second semiconductor switch 3 are turned on (in an open state) and the output end of the boost circuit 1 and the output end of the battery are directly connected to each other, or prevents a current from flowing from the boost circuit 1 into the battery via a parasitic diode of the second semiconductor switch 3 even when only the second semiconductor switch 3 is turned off (in a closed state).

The second diode 6 includes an anode terminal connected to the other end of the electromagnetic coil L and a cathode terminal connected to a secondary-side input/output end of the boost circuit 1. The second diode 6 is a regenerative diode which supplies (regenerates) a regenerative current output from the electromagnetic coil L to the battery via the boost circuit 1. The third diode 7 is a regenerative diode which includes a cathode terminal connected to one end of the electromagnetic coil L and an anode terminal connected to the ground (GND; a reference potential) and forms a flow path of the regenerative current.

The current detection resistor 8 is a shunt resistor which includes one end connected to a source terminal of the third semiconductor switch 4 and the other end connected to GND (a reference potential). That is to say, the current detection resistor 8 is connected in series to the electromagnetic coil L via the third semiconductor switch 4, and a drive current flowing through the electromagnetic coil L passes through the current detection resistor 8. That is to say, a voltage (a detected voltage) corresponding to a magnitude of a drive current is generated between one end and the other end of the current detection resistor 8. Both ends (one end and the other end) of the current detection resistor 8 are individually connected to input ends provided in the current detector 9d.

The control IC 9 is an integrated circuit (IC) which controls the boost circuit 1, the first to third semiconductor switches 2 to 4 based on a command signal input from the higher-ordered control system and includes a plurality of input terminals and output terminals. In the control IC 9, the boost controller 9a generates a boost control signal (a boost pulse) based on a control command input from the main controller 9f and outputs the boost control signal (a boost pulse) to the boost circuit 1. This boost control signal is a control signal for controlling an operation of the boost circuit 1.

The I-peak controller 9b generates a first gate signal for controlling the first semiconductor switch 2 based on a control command input from the main controller 9f and outputs the first gate signal to a gate terminal of the first semiconductor switch 2. The I-hold controller 9c generates a second gate signal for controlling the second semiconductor switch 3 based on a control command input from the main controller 9f and outputs the second gate signal to a gate terminal of the second semiconductor switch 3.

The current detector 9d includes a pair of input ends and one output end, one input end of the pair of input ends is connected to one end of the current detection resistor 8 and the other input end of the pair of input ends is connected to the other end of the current detection resistor 8. That is to say, a detected voltage generated in the current detection resistor 8 is input to the current detector 9d. The current detector 9d calculates a detected current indicating a magnitude of a drive current such as a hold current based on the detected voltage and outputs the detected current to the main controller 9f The current detector 9d, the third semiconductor switch 4, and the current detection resistor 8 constitute a detector of the present invention.

The electromagnetic valve on/off controller 9e generates a third gate signal for controlling the third semiconductor switch 4 based on a control command input from the main controller 9f and outputs the third gate signal to a gate terminal of the third semiconductor switch 4.

The main controller 9f generates a control command based on a detected current input from the current detector 9d and an external control command input from an external higher-ordered control system and outputs the control command to the boost controller 9a, the I-peak controller 9b, the I-hold controller 9c, and the electromagnetic valve on/off controller 9e. The external control command includes information associated with an operation timing of the fuel injection valve B that is a timing at which electricity is supplied to the electromagnetic coil L.

A detailed constitution of the I-hold controller 9c will be described below with reference to FIG. 2.

Figure 2:
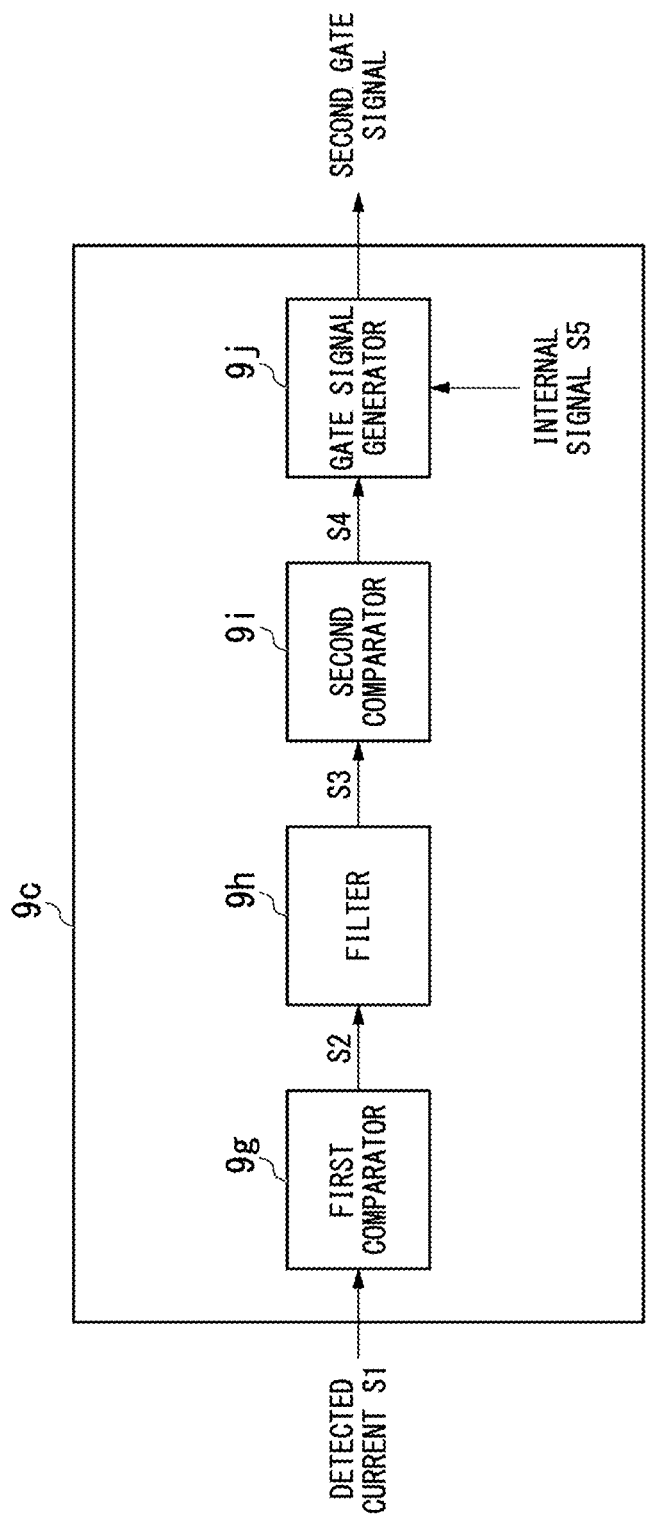
FIG. 2 is a block diagram illustrating a detailed constitution of an I-hold controller in the embodiment of the present invention.

As illustrated in FIG. 2, the I-hold controller 9c includes at least a first comparator 9g, a filter 9h, a second comparator 9i, and a gate signal generator 9j. The first comparator 9g compares a detected current S1 input from the current detector 9d via the main controller 9f with a first threshold value R1 and outputs a first CP signal S2 indicating the comparison result to the filter 9h. The first threshold value R1 is a maximum value threshold value for setting a maximum value of a hold current.

The filter 9h is a count-up/down type digital filter. That is to say, the filter 9h performs digital low-pass filter processing (integration processing) on the first CP signal S2 input from the first comparator 9g to generate a filter output signal S3 and outputs the filter output signal S3 to the second comparator 9i. The second comparator 9i compares the filter output signal S3 with a second threshold value R2 and outputs a second CP signal S4 indicating the comparison result to the gate signal generator 9j.

The gate signal generator 9j generates a second gate signal based on the second CP signal S4 and an internal signal S5 which is separately generated and outputs the second gate signal to the gate terminal of the second semiconductor switch 3. The gate signal generator 9j is a control signal generator which generates the second gate signal (the control signal) for controlling the second semiconductor switch 3 (the power supplier) based on the second CP signal S4, that is, the output of the second comparator 9i.

An operation of the fuel injection valve drive device K constituted in this way will be described in detail below with reference to FIGS. 3 and 4.

Figure 3:
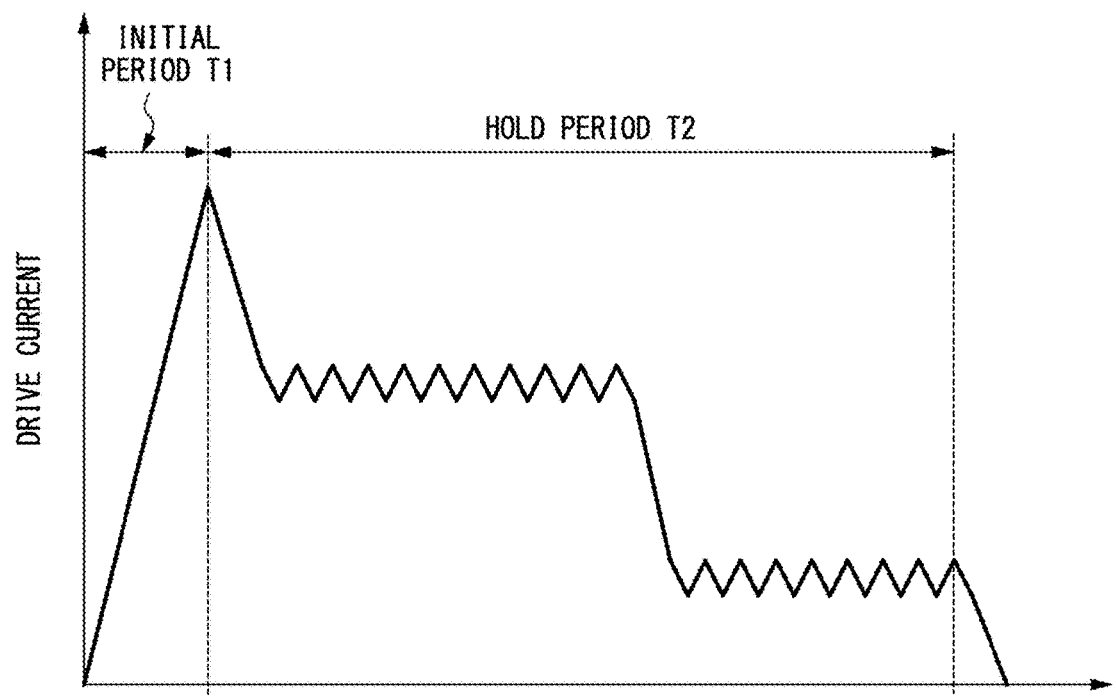
FIG. 3 is a timing chart for describing an operation of the fuel injection valve drive device according to the embodiment of the present invention.
Figure 3:
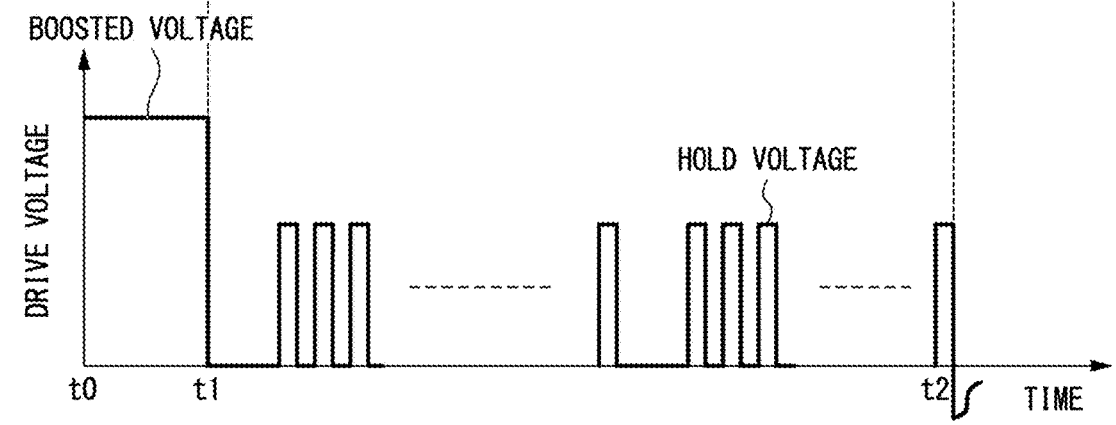

When the fuel injection valve drive device K drives the fuel injection valve B from a closed state to an open state, as illustrated in FIG. 3, in an initial period T1 when driving starts (a period from time t0 to time t1), the control IC 9 supplies a boosted voltage generated by the boost circuit 1 to the electromagnetic coil L as a power source voltage, and, in a hold period T2 after the initial period T1 (a period of time t1 to time t2: when a hold current is driven), the control IC 9 supplies a battery voltage to the electromagnetic coil L as a power source voltage instead of a boosted voltage.

That is to say, in the initial period T1, the boost controller 9a outputs a boost pulse to the boost switch of the boost circuit 1 so that the boost circuit 1 outputs a boosted voltage to the drain terminal of the first semiconductor switch 2. Furthermore, in the initial period T1, the I-peak controller 9b outputs a first gate signal to the gate terminal of the first semiconductor switch 2 so that the first semiconductor switch 2 is set to a turned-on state, and the electromagnetic valve on/off controller 9e outputs a third gate signal to the gate terminal of the third semiconductor switch 4 so that the third semiconductor switch 4 is set to a turned-on state. In addition, at this time, the second semiconductor switch 3 is set to a turned-off state.

As a result, in the initial period T1, a relatively high boosted voltage is applied to one end of the electromagnetic coil L as shown in the lower part of FIG. 3 (part (b) of FIG. 3). Thus, a peak-shaped rising current flows through the electromagnetic coil L as shown in the upper part of FIG. 3 (part (a) of FIG. 3). Such a peak-shaped rising current increases a speed of a valve opening operation of the fuel injection valve B.

Also, in the hold period T2, the I-hold controller 9c outputs a second gate signal to the second semiconductor switch 3 so that the second semiconductor switch 3 is set to a turned-on state, and the electromagnetic valve on/off controller 9e outputs a third gate signal to the gate terminal of the third semiconductor switch 4 so that the third semiconductor switch 4 is set to a turned-on state. Furthermore, at this time, the first semiconductor switch 2 is set to a turned-off state.

As a result, in the hold period T2, as shown in the lower part of FIG. 3, a hold voltage lower than a boosted voltage is intermittently applied to the electromagnetic coil L, and as a result, a hold current which holds an open state of the fuel injection valve B flows through the electromagnetic coil L. That is to say, after a current peak when the supply of electricity starts has passed, the fuel injection valve drive device K according to the present invention supplies a hold current having a prescribed fluctuation range to the electromagnetic coil L.

The I-hold controller 9c supplies a pulse width modulation (PWM) signal having a prescribed duty ratio to the second semiconductor switch 3 as a second gate signal, and as a result, intermittently supplies the hold voltage to the electromagnetic coil L in accordance with the duty ratio. Furthermore, the I-hold controller 9c sets a duty ratio of the second gate signal based on a detected current S1 included in a control command of the main controller 9f That is to say, the I-hold controller 9c sets a duty ratio of the second gate signal based on a magnitude of a drive current flowing through the electromagnetic coil L. Thus, feedback control is performed such that a fluctuation range of the hold current is within a prescribed target range (a desired range).

Through such feedback control, as shown in the upper part of FIG. 3, in the hold period T2, a constant hold current is supplied to the electromagnetic coil L. Thus, an open state of the fuel injection valve B is held. Furthermore, in the hold period T2, for example, when a duty ratio of the second gate signal is changed in two stages, the hold current is changed in two stages as shown in the upper part of FIG. 3.

Here, the I-hold controller 9c generates a second gate signal based on the detected current S1 as will be described later. That is to say, the detected current S1 is processed to be compared with the first threshold value R1 by the first comparator 9g of the I-hold controller 9c so that a first CP signal S2 is generated as shown in the uppermost part (part (a) of FIG. 4) and the second part from the top of FIG. 4 (part (b) of FIG. 4).

Figure 4:
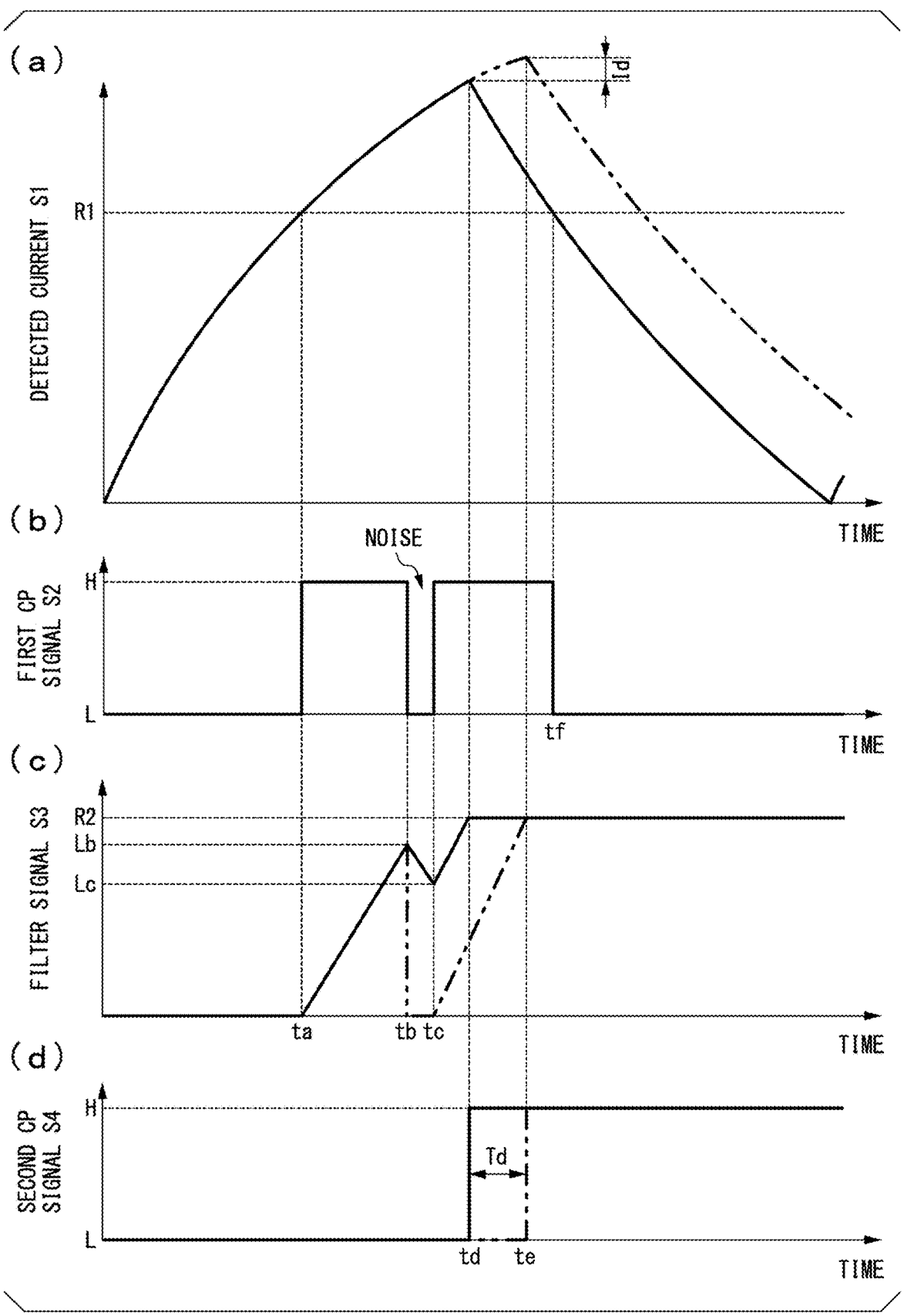
FIG. 4 is a timing chart for describing a main part operation in the embodiment of the present invention.

The first CP signal S2 is a pulse signal which changes from an L level (a Low level) to a H level (a Hi level) at time ta and changes from the H level to the L level at time tf as shown in the second part from the top of FIG. 4 when the above-described noise does not act. That is to say, the first CP signal S2 is a pulse signal obtained by binarizing the detected current S1 using the first threshold value R1.

Also, such a first CP signal S2 is subjected to low-pass processing (integration processing) by the filter 9h so that a filter output signal S3 is generated as shown in the second part from the top of FIG. 4 (part (c) of FIG. 4). The filter output signal S3 is a signal which increases with an inclination according to a filter time constant of the filter 9h at time ta, and the first CP signal S2 changes from the H level to the L level at time tb before time tf due to noise acting on the first CP signal S2 as shown in the drawing.

That is to say, the filter output signal S3 decreases between time tb and time tc from a level Lb which is a level immediately before time tb with an inclination according to a filter time constant due to the influence of the above-described noise, and a level of the filter output signal S3 drops to a level Lc at time tc at which the influence of noise disappears. Furthermore, the filter output signal S3 increases from the level Lc and from time tc with an inclination corresponding to the filter time constant. In addition, if the filter output signal S3 finally reaches the second threshold value R2, a level corresponding to the second threshold value R2 is held.

When the filter output signal S3 whose level fluctuates in this way is compared with the second threshold value R2 in the second comparator 9i, as shown in the lowermost part of FIG. 4 (part (d) of FIG. 4), a second CP signal S4 which changes from an L level to a H level is generated at time td. The time td in the second CP signal S4 corresponds to a timing at which the application of the hold voltage to the electromagnetic coil L in the second gate signal stops.

Here, the alternate long and two short dashes line in FIG. 4 indicates a method for generating a second CP signal S4 in the related art. That is to say, in the method in the related art, if noise acts on a first CP signal S2, filter processing in the filter 9h is reset. As a result, since the filter processing is repeatedly performed from an L level at time tc, a time at which a filter output signal reaches the second threshold value R2 is time to at which time delays from the time td in the embodiment. Therefore, in the method in the related art, a timing at which a hold current changes from increasing to decreasing is delayed by a period Td as compared with the embodiment. Thus, a maximum value of the hold current increases by a current value Id corresponding to that of the period Td.

Incidentally, the gate signal generator 9j generates a second gate signal based on the above second CP signal S4 described above and an internal signal S5 indicating a timing at which the application of the hold voltage to the electromagnetic coil L starts. That is to say, the second gate signal is a control signal which sets a maximum value of the hold current based on the second CP signal S4 by stopping or by stopping and resuming the application of the hold voltage to the electromagnetic coil L and sets a lower limit value of the hold current based on the internal signal S5.

According to such a fuel injection valve drive device K according to the embodiment, even if noise acts on the first CP signal S2, the low-pass filter process (the integration processing) in the filter 9h is continued without being reset. Thus, it is possible to limit a maximum value of the hold current of the fuel injection valve B (the electromagnetic valve) to within a desired range more accurately than in the related art. Therefore, according to such a fuel injection valve drive device K, it is possible to limit the fluctuation range of the hold current within a desired range more accurately than that in the related art.

The present invention is not limited to the above embodiment, and for example, the following modified examples are conceivable.

(1) Although the I-hold controller 9c is constituted to limit a maximum value of a hold current within a desired range in the above embodiment, the present invention is not limited thereto. That is to say, the I-hold controller may be constituted to limit a minimum value of a hold current within a desired range or to limit a maximum value and a minimum value of a hold current within a desired range. Furthermore, the above-described first threshold value R1 may be a minimum value threshold value for setting a minimum value of a hold current.

(2) Although the fuel injection valve B is used as a driving target in the above embodiment, the present invention is not limited thereto. The present invention can be applied to drive various electromagnetic valves other than the fuel injection valve B.

(3) Although the fuel injection valve B for the direct injection engine is a driving target in the above embodiment, the present invention is not limited thereto. The present invention can be applied to drive a fuel injection valve other than a direct injection engine.

(4) Although the fuel injection valve drive device K is constituted to include the boost circuit 1, the first semiconductor switch 2, the second semiconductor switch 3, the third semiconductor switch 4, the first diode 5, the second diode 6, the third diode 7, the current detection resistor 8, the control IC 9, and the like in the above embodiment and the control IC 9 is constituted to include the boost controller 9a, the I-peak controller 9b, the I-hold controller 9c, the current detector 9d, and the main controller 9f, the present invention is not limited thereto. The constitution illustrated in FIG. 1 is merely an example of the electromagnetic valve drive device according to the present invention.

REFERENCE SYMBOLS

B Fuel injection valve
K Fuel injection valve drive device
L Electromagnetic coil
1 Boost circuit
2 First semiconductor switch (second power supplier)

3 Second semiconductor switch (power supplier)
4 Third semiconductor switch
5 First diode
6 Second diode
7 Third diode
8 Current detection resistor
9 Control IC
9a Boost controller
9b I-peak controller
9c I-hold controller
9d Current detector
9e Electromagnetic valve on/off controller
9f Main controller
9g First comparator
9h Filter
9i Second comparator
9j Gate signal generator

What is claimed is:

1. An electromagnetic valve drive device which applies a drive voltage to an electromagnetic coil of an electromagnetic valve to supply a drive current to the electromagnetic coil, comprising:
    a power supplier which intermittently applies a hold voltage as the drive voltage to the electromagnetic coil to supply a hold current as the drive current to the electromagnetic coil;
    a detector which calculates a detected current indicating a magnitude of the drive current;
    a first comparator which compares a hold detected current as the detected current calculated by the detector with a first threshold value that is a predetermined value greater than zero, the hold detected current indicating a magnitude of the hold current;
    a filter which performs integration processing on an output of the first comparator;
    a second comparator which compares an output of the filter with a second threshold value that is a predetermined value greater than zero to generate an output signal used for generating a control signal for controlling the power supplier; and
    a control signal generator which generates the control signal for controlling the power supplier based on the output signal of the second comparator,
    wherein the filter is a count-up/down type digital filter,
    the power supplier supplies the hold current to the electromagnetic coil after the detected current increases to reach a predetermined current peak value, and
    the power supplier supplies the hold current to the electromagnetic coil such that the hold detected current fluctuates between a prescribed maximum value and a prescribed minimum value that are lower than the current peak value, greater than zero and different from each other.

2. The electromagnetic valve drive device according to claim 1,
    wherein the first threshold value is a threshold value to set at least one of the maximum value or the minimum value of the hold detected current, and
    the control signal generator generates the control signal for controlling the power supplier such that the hold detected current fluctuates between the maximum value and the minimum value by stopping or by stopping and resuming an application of the drive voltage to the electromagnetic coil.

3. The electromagnetic valve drive device according to claim 2, further comprising:
    a boost circuit which boosts a battery voltage to generate a boosted voltage; and
    a second power supplier which applies the boosted voltage to the electromagnetic coil until the detected current increases to reach the current peak value.

4. The electromagnetic valve drive device according to claim 1,
    wherein the electromagnetic valve is a fuel injection valve which injects fuel directly into a cylinder of a direct injection engine.

5. The electromagnetic valve drive device according to claim 2,
    wherein the electromagnetic valve is a fuel injection valve which injects fuel directly into a cylinder of a direct injection engine.

6. The electromagnetic valve drive device according to claim 3,
    wherein the electromagnetic valve is a fuel injection valve which injects fuel directly into a cylinder of a direct injection engine.

* * * * *